United States Patent
Furukawa et al.

(10) Patent No.: US 6,922,563 B2
(45) Date of Patent: Jul. 26, 2005

(54) METHOD FOR DETECTING A SHIELD IN PREDICTING RADIO WAVE PROPAGATION CHARACTERISTICS AND SYSTEM FOR USE WITH THE SAME METHOD

(75) Inventors: Hiroshi Furukawa, Tokyo (JP); Yoshinori Watanabe, Tokyo (JP)

(73) Assignee: NEC Corporation (JP)

( * ) Notice: Subject to any disclaimer, the term of this patent is extended or adjusted under 35 U.S.C. 154(b) by 548 days.

(21) Appl. No.: 09/962,886

(22) Filed: Sep. 25, 2001

(65) Prior Publication Data

US 2002/0039898 A1 Apr. 4, 2002

(30) Foreign Application Priority Data

Oct. 4, 2000 (JP) ........................................ 2000-304294

(51) Int. Cl.$^7$ ................................................ H04Q 7/20
(52) U.S. Cl. ............................ 455/446; 703/2; 703/13; 455/67.16
(58) Field of Search ................................ 703/2, 13, 20, 703/5; 455/446, 423, 424, 39, 67.16; 342/457, 450; 324/26, 95

(56) References Cited

U.S. PATENT DOCUMENTS 5,301,127 A * 4/1994 Hitney ......................... 342/26
5,623,429 A * 4/1997 Fortune et al. .................. 703/3
6,499,006 B1 * 12/2002 Rappaport et al. ............. 703/20

FOREIGN PATENT DOCUMENTS

JP          9-33584         2/1997

\* cited by examiner

*Primary Examiner*—Charles Appiah
*Assistant Examiner*—Joy Contee
(74) *Attorney, Agent, or Firm*—Dickstein, Shapiro, Morin & Oshinsky, LLP

(57) ABSTRACT

An object of the present invention is to provide a method for detecting a shield in predicting the radio wave propagation characteristics by a technique of the geometrical optics capable of detecting a content which a ray strikes, at high rate, when the ray is radiated within the observation space. In the case where the rays and the contents are given, the projected objects given by the line or plane are set up, and if an image of the content projected onto the projected object and an image of the ray projected onto the projected object do not intersect, the content is excluded from the shield detection object. A plurality of projected objects i (i=1 to M) are prepared, the selection of shield detection object is performed for each projected object i in order for i=1 to M, and the content of the shield detection object is concluded in sequence. Though the conventional method required the multiple variable equations to be solved for all the contents within the observation area, this invention allows the multiple variable equations to be solved only for the concluded contents of the shield detection object. Hence, the processing time can be shortened.

18 Claims, 8 Drawing Sheets

| i | PROJECTED OBJECT |
|---|---|
| 1 | x – AXIS |
| 2 | y – AXIS |
| 3 | z – AXIS |
| 4 | x y – PLANE |
| 5 | z x – PLANE |

METHOD FOR DETECTING A SHIELD IN PREDICTING RADIO WAVE PROPAGATION CHARACTERISTICS AND SYSTEM FOR USE WITH THE SAME METHOD

BACKGROUND OF THE INVENTION

1. Field of the Invention

The present invention relates to a method for detecting a shield in predicting the radio wave propagation characteristics, a system for use with the method, and a recording medium recording an operation control program of the detecting method, and in particular to a method for detecting a shield in predicting the radio wave propagation characteristics by a technique of the geometrical optics.

2. Description of the Prior Art

A radio wave propagation simulator is employed to assist the arrangement of a base station or a host system in a radio communications system. The received power or delay spreading at any receiving point is assessed by using the radio wave propagation simulator to determine an installation site of a due transmitting station, so that the overall efficiency can be enhanced by reducing the number of base stations to be arranged.

The radio wave propagation simulation is largely divided into a statistical technique and a deterministic technique. The former statistical technique gives an expression for estimating the propagation loss with the arguments of distance and frequency to determine the parameters on the basis of a large amount of data resulted from actual measurements of the propagation loss in accordance with the multivariate analysis.

On the other hand, the latter deterministic technique is one in which, considering that the radio wave radiated from an antenna is a collection of a number of radio wave rays, each ray is reflected and transmitted repeatedly on the geometrical optics, and propagated, and the rays incoming to an observation point is synthesized to obtain the propagation loss and the amount of delay. This technique of geometrical optics is further subdivided into an imaging technique and a ray launching technique.

The imaging technique determines a reflection and transmission path of the ray connecting between the transmitting and receiving points by obtaining an imaging point against the reflection surface. Since the reflection and transmission path is uniquely determined if the transmitting and receiving points and the reflecting and transmitting objects are defined, the imaging technique is one of searching for a strict propagation route of the ray. On the other hand, the ray launching technique is one of radiating the ray from an antenna in plural predetermined directions in a manner of time division, irrespective of the receiving point to obtain the propagation route of the ray with the reflection and transmission, and regarding the ray passing near the receiving point as incoming to the receiving point. This was described in particular in the paragraphs "004" to "006" in Japanese Patent Laid-Open No. 9-33584, for example.

The ray launching technique solves approximately, but not strictly like the imaging technique, the propagation route of the ray connecting between the transmitting and receiving points, and has a feature of shortening the time needed to search for the propagation route.

FIG. 8 is a view for explaining the operation of the ray launching technique in the case where an observation area 020, a transmitting point 009, a receiving point 010, and two contents 001, 002 within the observation area are provided. In FIG. 8, for the simplicity, the operation is explained only in the two dimensional plane, but it is common that the operation is performed in the three dimensional space.

First of all, a ray is radiated from the transmitting point 009 in a direction toward the propagation route 003. It is determined from all the contents within the observation area whether or not the ray radiated in that direction strikes the contents existing within the observation area. The ray strikes a content 001 at a reflection point 012, resulting in a transmitted ray 011 and a reflected ray 004. The ray 004 produced by reflection further strikes a content 002, resulting in a transmitted ray 013 and a reflected ray 008 in a similar manner. The reflected ray 008, which passes near the receiving point (observation point) 010, is regarded as the incoming wave in the observation point.

Specifically, the received electric-field strength as defined from a total of propagation distances and a total of incoming delay times of the propagation routes 003, 004 and 008, are recorded in FIG. 9. In FIG. 9, the transverse axis 101 represents the delay time required for the ray to arrive from the transmitting point 009 via the routes 003, 004 and 008 to the observation point 010, and the longitudinal axis 102 represents the received electric-field strength of the ray passing near the observation point 010 and the ray incoming to the observation point 010.

The ray from the transmitting point 009 in the direction toward the propagation route 003 has the transmitted rays 011 and 013, for which the transmission and reflection are repeatedly searched, as in the propagation routes 003, 004 and 008, wherein the ray passing near the receiving point 010 is treated as the incoming wave, as in the propagation route 008, and the above processing is continued till the search end condition is met.

The search end condition is that the received electric-field strength at the reflection and transmission point falls below a predetermined value. After the ray radiated from the transmitting point 009 in the direction toward the propagation route 003 is searched for the routes of the reflection and transmission, the radiation angle of the ray radiated from the transmitting point 009 is changed, as shown in a route 006, for example, and the reflection and transmission routes are similarly searched, investigating all the radiation directions from the transmitting point 009, or partial radiation directions as defined beforehand.

Lastly, FIG. 10 shows a delay profile for the receiving point (observation point) 010. In FIG. 10, the transverse axis 201 represents the delay time when the ray comes in from the transmitting point 009, and the longitudinal axis 202 represents the received electric-field strength of the ray passing near the receiving point 010 and the ray incoming to the receiving point 010. The received power at the receiving point 010 is given by a total of received electric-field strength for all the paths as indicated in FIG. 10, and the delay spreading indicating the distortion is given by the standard deviation of the delay time.

The ray launching technique have to check for all the contents existing within the observation space whether or not the ray strikes the contents to detect the reflecting or transmitting point on the propagation route of the ray. It is necessary to solve multiple variable equations to check whether or not the ray intersects the content within the three dimensional space, which requires a quite amount of computation. That is, to detect the reflected or transmitted point, an expression as defined in the three dimensional space representing the reflection face and an expression as defined in the three dimensional space representing the ray are simultaneously solved as a general calculation technique, bringing about a considerable amount of computation. Hence, there is the problem that the amount of computation needed for the investigation increases with more contents within the observation space, and it takes a lot of time to assess the propagation characteristics.

SUMMARY OF THE INVENTION

An object of the present invention is to provide a method and system for detecting a shield in predicting the radio wave propagation characteristics by a technique of the geometrical optics capable of detecting a content which a ray strikes, at high rate, when the ray is radiated within the observation space, and a recording medium for use with the system.

According to the present invention, there is provided a shield detection method for detecting a shield shielding a ray among a plurality of contents in predicting the radio wave propagation characteristics, wherein the plurality of contents are provided in an observation space as defined within a three dimensional space, and the radio wave rays are radiated over the observation space, comprising:

a first step of acquiring a first image of the ray projected onto a projected object preset within the observation space;

a second step of acquiring a second image of each of the contents projected onto the projected object;

a third step of determining whether or not the first image and the second image intersect each other; and a fourth step of concluding a corresponding content as the shield detection object for the ray, in the case where the result of determination indicates the intersection.

And the M projected objects (M is an integer of 2 or greater) are set up, the first to fourth steps are executed for a projected object i=1 (i is from 1 to M), then for a content concluded at the fourth step, the first to fourth steps are executed for a projected object i=2, and the same processing is repeated till a projected object i=M.

According to the present invention, there is provided a shield detection method for detecting a shield shielding a ray among a plurality of contents in predicting the radio wave propagation characteristics, wherein the plurality of contents are provided in an observation space as defined within a three dimensional space, and the radio wave rays are radiated over the observation space, comprising:

a step of acquiring an image A of the ray projected onto a projected object i, in which a plurality of projected objects i (i=1 to M: M is an integer of 2 or greater) are set up within the observation space, a group k (k=0 to M) representing part or all of the contents is defined, and a group 0 is a set of all the contents as defined within the observation space;

a step of selecting one content from a group i-1 and acquiring an image B of the content projected onto the projected object a step of practicing a selectively incorporating process by checking whether or not the images A and B intersect, and selectively incorporating the content into the group i if the images A and B intersect;

a step of practicing the selectively incorporating process of the contents included In the group i by practicing the selectively incorporating process for each of all other contents in the group i-1; and a step of detecting the shield for the contents included in the group M and concluded ultimately by practicing the selectively incorporating process of the contents for i=1 to M in sequence.

And supposing that the projected object i is the line or plane as defined in the three dimensional space, different lines or planes are assigned to the projected objects. Also, the line is assigned to each of the projected objects i=1 to L (L is an integer such as 2≦L<M), and the plane is assigned to each of the projected objects i=L+1 to M. Further, the projected object i is set at a smaller value as the length of the ray projected onto the projected object is smaller. Specifically, supposing that the absolute value of an elevation angle of the ray with respect to a predetermined plane is t, and the absolute value of an elevation angle of the projected object with respect to the predetermined plane is T, the projected object is variably set in accordance with the value of t, and the projected object i is set such that there is a greater difference between t and T1 for smaller i.

According to the present invention, there is provided a shield detection system for detecting a shield shielding a ray among a plurality of contents in predicting the radio wave propagation characteristics, wherein the plurality of contents are provided in an observation space as defined within a three dimensional space, and the radio wave rays are radiated over the observation space, comprising:

first image acquiring means for acquiring a first image of the ray projected onto a projected object preset within the observation space;

second image acquiring means for acquiring a second image of each of the contents projected onto the projected object;

determination means for determining whether or not the first image and the second image intersect each other; and detection object concluding means for concluding a corresponding content as the shield detection object for the ray, in the case where the result of determination indicates the intersection.

And the shield detection system further comprises control means for controlling the execution of the first image acquiring means, the second image acquiring means, the determination means and the detection object concluding means, such that the M projected objects (M is an integer of 2 or greater) are set up, the first image acquiring means, the second image acquiring means, the determination means and the detection object concluding means are controlled for execution for a projected object i=1 (i is from 1 to M), then for a content concluded by the detection object concluding means, the first image acquiring means, the second image acquiring means, the determination means and the detection object concluding means are controlled for execution for a projected object i=2, and the same control for execution is repeated till a projected object i=M.

According to the present invention, there is provided a shield detection system for detecting a shield shielding a ray among a plurality of contents in predicting the radio wave propagation characteristics, wherein the plurality of contents are provided in an observation space as defined within a three dimensional space, and the radio wave rays are radiated over the observation space, comprising:

means for acquiring an image A of the ray projected onto a projected object i, in which a plurality of projected objects i (i=1 to M: M is an integer of 2 or greater) are set up within the observation space, a group k (k=0 to M) representing part or all of the contents is defined, and a group 0 is a set of all the contents as defined within the observation space;

means for selecting one content from the group i-1 and acquiring an image B of the content projected onto the projected object i;

means for practicing a selectively incorporating process by checking whether or not the images A and B intersect, and selectively incorporating the content into the group i if the images A and B intersect;

means for practicing the selectively incorporating process of the contents included in the group i by practicing the selectively incorporating process for each of all other contents in the group i-1; and means for detecting the shield for the contents included in a group M and concluded ultimately by practicing the selectively incorporating process of the contents for i=1 to M in sequence.

According to the present invention, there is provided a recording medium recording an operation control program for a shield detection method for detecting a shield shielding a ray among a plurality of contents in predicting the radio wave propagation characteristics, wherein the plurality of contents are provided in an observation space as defined within a three dimensional space, and the radio wave rays are radiated over the observation space, the program comprising:

a first step of acquiring a first image of the ray projected onto a projected object preset within the observation space;

second step of acquiring a second image of each of the contents projected onto the projected object;

a third step of determining whether or not the first image and the second image intersect each other; and a fourth step of concluding a corresponding content as the shield detection object for the ray, in the case where the result of determination indicates the intersection.

According to the present invention, there is provided a recording medium recording an operation control program for a shield detection method for detecting a shield shielding a ray among a plurality of contents in predicting the radio wave propagation characteristics, wherein the plurality of contents are provided in an observation space as defined within a three dimensional space, and the radio wave rays are radiated over the observation space, the program comprising:

a step of acquiring an image A of the ray projected onto a projected object i, in which a plurality of projected objects i (i=1 to M: M is an integer of 2 or greater) are set up within the observation space, a group k (k=0 to M) representing part or all of the contents is defined, and a group 0 is a set of all the contents as defined within the observation space;

a step of selecting one content from a group i-1 and acquiring an image B of the content projected onto the projected object i;

a step of practicing a selectively incorporating process by checking whether or not the images A and B intersect, and selectively incorporating the content into the group i if the images A and B intersect;

a step of practicing the selectively incorporating process of the contents included in the group i by practicing the selectively incorporating process for each of all other contents in the group i-1; and a step of detecting the shield for the contents included in a group M and concluded ultimately by practicing the selectively incorporating process of the contents for i=1 to M in sequence.

The effects of the present invention will be described below. When the rays and the contents are given, the projected objects provided by the line or plane are set up, the content and the ray are projected onto the projected object. If the obtained images do not intersect each other, the content is excluded from the shield detection object, and the shield detection object is concluded. In this case, a plurality of projected objects i (i=1 to M) are prepared, and the shield detection object is selected for each projected object i for i=1 to M in sequence, whereby the contents of the shield detection object are concluded in sequence. With the conventional method, it is required to solve the multiple variable equations for all the contents within the observation area as described previously. However, with the present invention, it is only necessary to solve the multiple variable equations only for the concluded contents of the shield detection object, making it possible to shorten the processing time.

In deciding i (order for concluding the shield detection object), it is preferred that, assuming that the absolute value of elevation angle of the ray with respect to a predetermined plane is t, and the absolute value of elevation angle of the projected object with respect to the predetermined plane is T, the projected object is variably set in accordance with the value of t, and i is set such that there is a greater difference between t and T for smaller i.

The reason will be described below. Since the observation area is typically finite, when the difference between the elevation angle t of the ray to be investigated and the elevation angle T of the projected object is large, the image of the ray onto the projected object has so small an occupying area that many contents without intersection can be detected. Accordingly, the projected object i is set such that the difference between t and T is greater as i is smaller, whereby the contents not intersecting the ray to be investigated can be excluded from the shield detection object at the early time, resulting in the reduced processing amount.

DETAILED DESCRIPTION OF THE PREFERRED EMBODIMENTS

Figure 1:
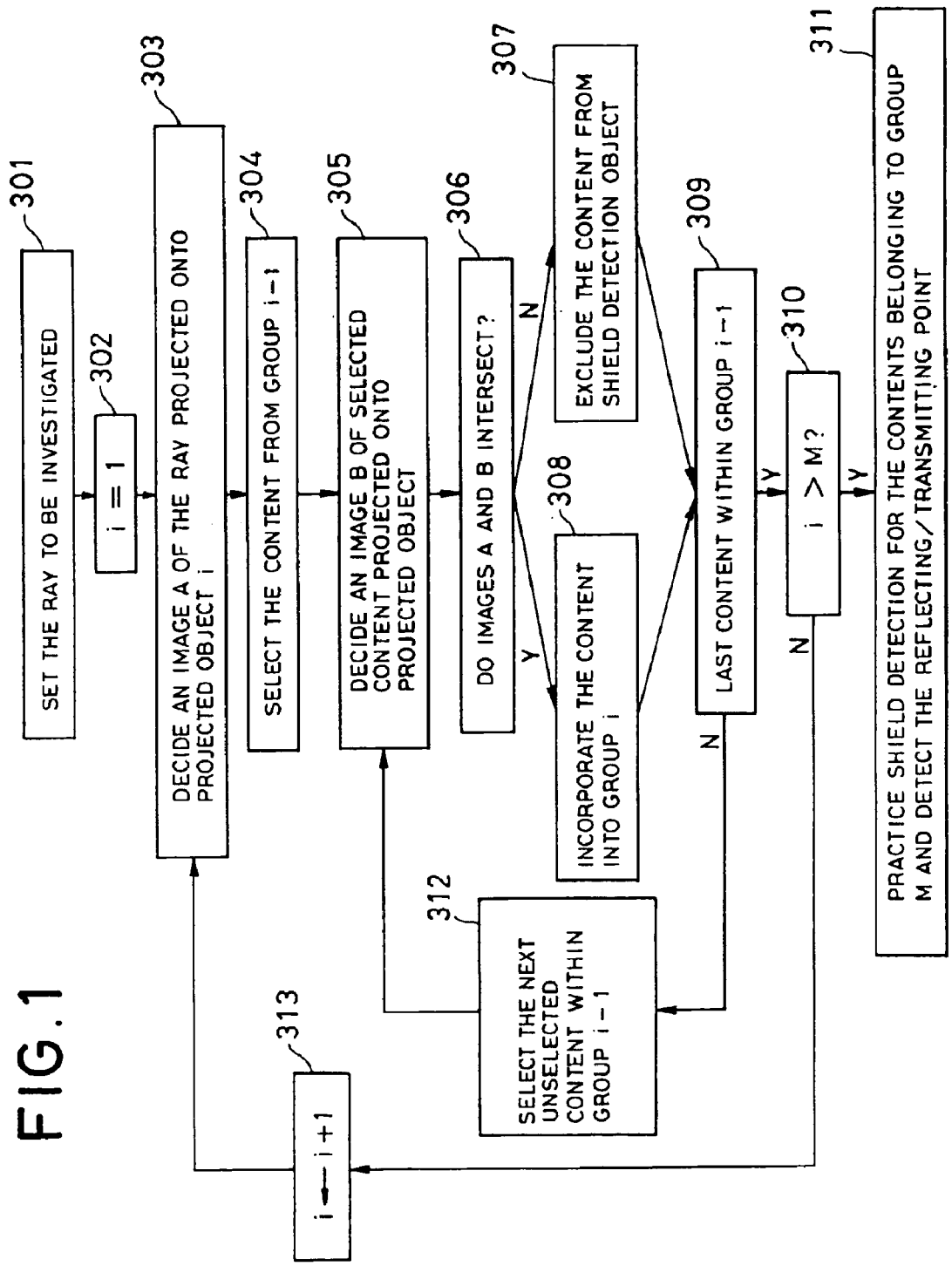
FIG. 1 is a flowchart showing an operation of an embodiment according to the present invention.
Figure 8:
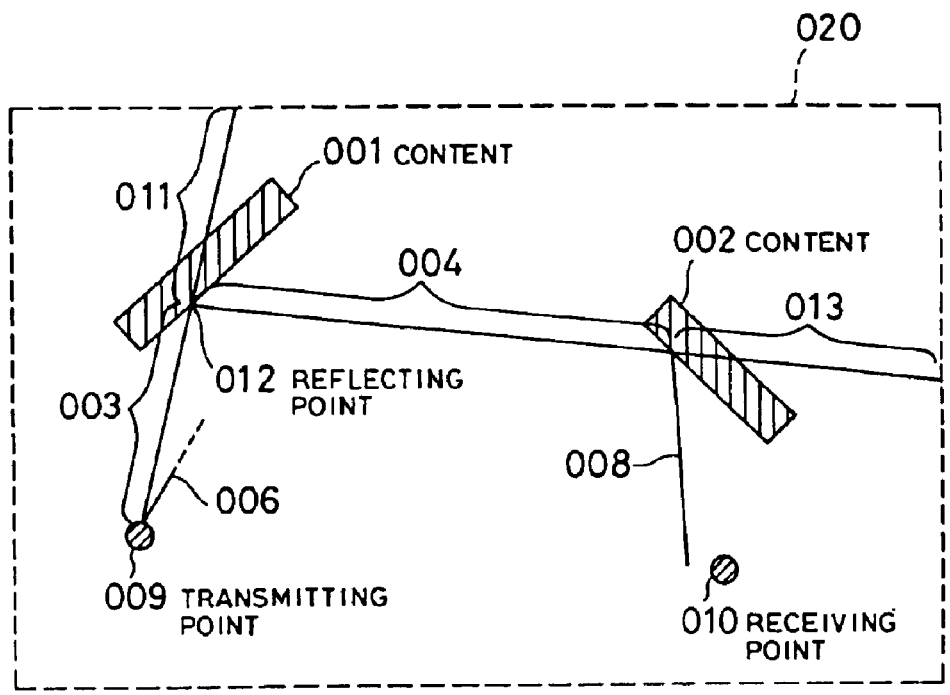
FIG. 8 is a view for explaining a ray launching technique.
Figure 9:
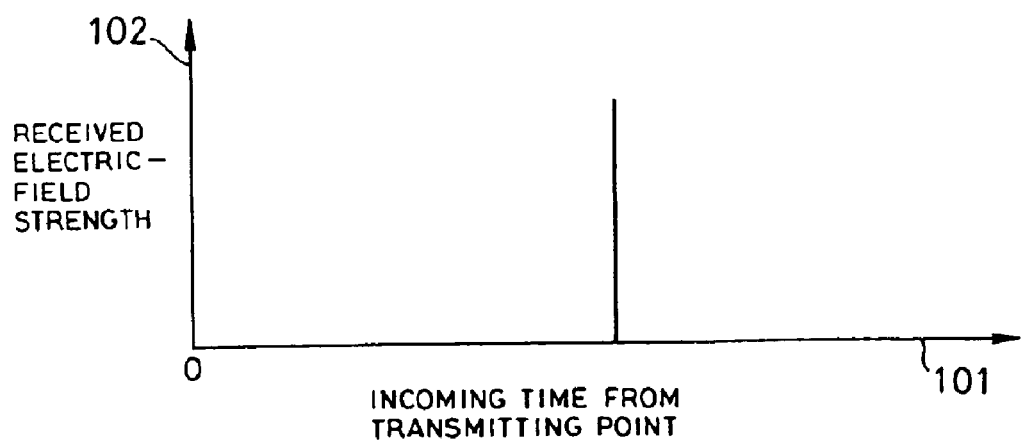
FIG. 9 is a graph showing an example of a path profile at an observation point for one ray.
Figure 10:
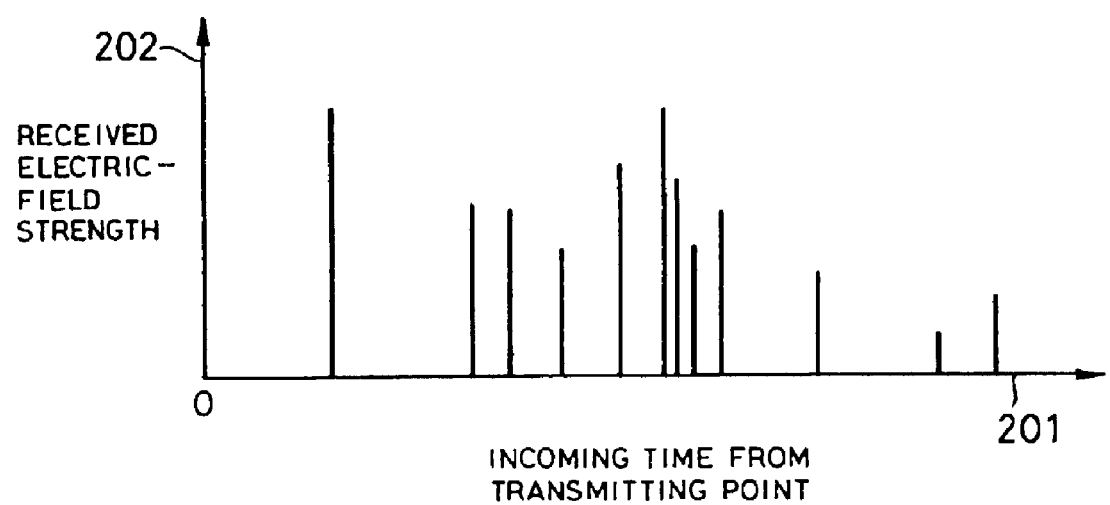
FIG. 10 is a graph showing a path profile at the observation point obtained by the ray launching technique.

The preferred embodiments of the present invention will be described below with reference to the accompanying drawings. FIG. 1 is a flowchart showing an embodiment of the invention. An observation area is given in the three dimensional space, the contents such as a wall and a fixture are provided within the observation area, and the rays to be investigated are set (step 301). The rays denote rays radiated from an antenna in accordance with a ray launching algorithm or rays produced by reflection or transmission, more specifically, a propagation route 003 or 004 in FIG. 8 described in the description of the Prior Art.

The internal variable i is defined, and i is set to 1 as the initial value (step 302). And an image A of the ray projected onto the projected object i is decided (step 303). Here, as the projected object i, the line or plane defined in the three dimensional space is employed. It is noted that the number of i is M. As the line, the x-axis, y-axis or z-axis is set in this embodiment. As the plane, the xy plane, yz plane or zx plane is set. And the projected object i is set differently for each i.

Figures 2, 3:
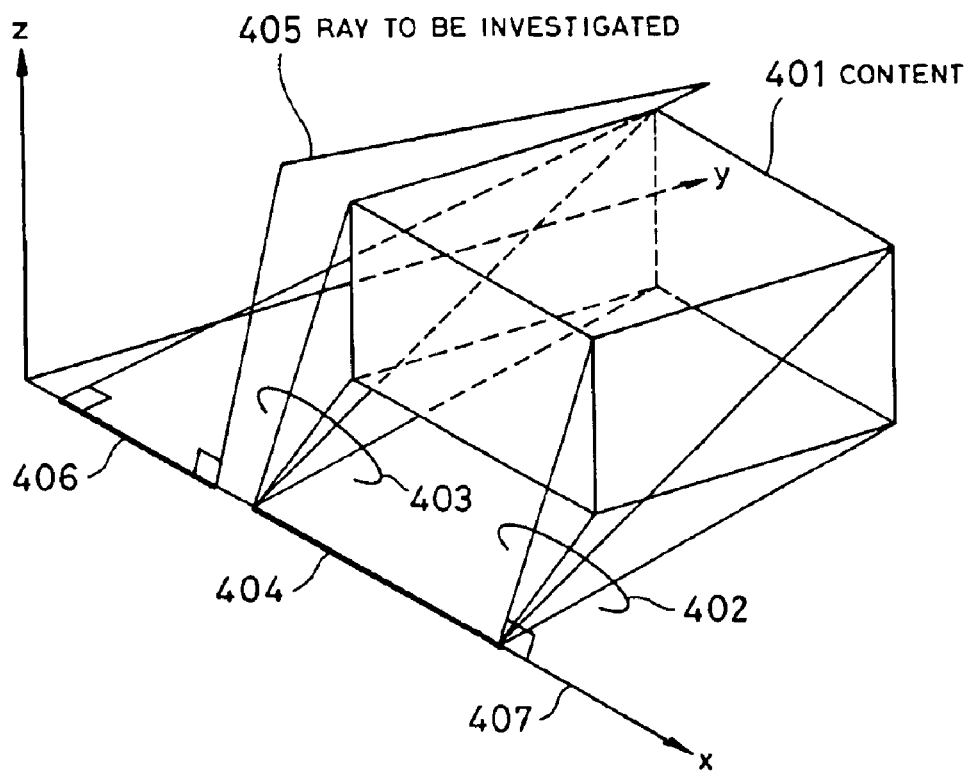
FIG. 2 is a table showing examples of the projected objects.
FIG. 3 is a view showing one example of projection when the projected object is an x-axis.

A projection method in a case where the projected object is the line involves, for example, investigating the points of intersection of the perpendicular from both end points of the ray toward the projected line, and assuming the line segment connecting the points located at its both ends as an image A (see FIG. 3). In this case, if the projected object is in particular the x-axis, y-axis or z-axis, the line segment connecting the maximum value and the minimum value among the coordinate values of the same axis at both end points of the ray (e.g., the x coordinate value if the projected object is the x-axis) becomes the image A. The projection method in a case where the projected object is the plane involves, for example, investigating the points of intersection of the perpendicular from both end points of the ray toward the projected plane, and assuming the line segment connecting the points located at its both ends as the image A (see FIG. 4).

Any one content is selected from the group i-1 giving a set of contents (step 304). Note that the group 0 is supposed to be a set of all contents set within the observation area.

And an image B of a selected content projected onto the projected object is decided (step 305). A projection method in a case where the projected object is the line involves, like the above example, investigating the points of intersection of the perpendicular from the vertex of the selected content toward the projected line, and assuming the line segment connecting the points located in the outermost contour at its both ends as the image B. In this case, if the projected object is in particular the x-axis, y-axis or z-axis, the line segment connecting the maximum value and the minimum value among the vertex coordinate values of the same axis for the content (e.g., the x coordinate value if the projected object is the x-axis) becomes the image B.

A projection method in a case where the projected object is the plane involves, like the above example, investigating the points of intersection of the perpendicular from the vertex of the selected content toward the projected plane, and assuming the area connecting the points located in the outermost contour as the image B.

Then, a determination is made whether or not the images A and B intersect (step 306). If they intersect, the procedure goes to step 308 to incorporate the content into the group i, or if not, the procedure proceeds to step 307 to exclude the selected content from the shield retrieval object.

And if the selected content is the last content among the group i-1 (step 309), the procedure proceeds to step 310. If not, the procedure goes to step 312 to select the next unselected content among the group i-1, and then gets back to step 305 again.

At step 310, it is checked whether or not the value of i is beyond the number M of projected objects, and if so, the procedure proceeds to step 311. If not, the procedure goes to step 313 to increment the value of i by one, and then gets back to step 303.

At step 311, for the content belonging to the group M, shield detection in the three dimensional space is practiced to calculate the reflecting or transmitting point concretely. Here, the multiple variable equations are employed to detect the shield and detect the reflecting or transmitting point as described above.

With respect to setting the projected object i, the line may be set as the projected object with the small value of i, and the plane may be set as the projected object with the large value of i, for example.

The operation of the embodiment of the invention as shown in FIG. 1 will be set forth by reference to FIGS. 2 to 5. FIG. 2 is a table showing an example of setting the projected object i in case of M=5. In FIG. 2, the line is set as the projected object with the small value of i, and the plane is set as the projected object with the large value of i.

As the line, the x-axis, the y-axis and the z-axis are set up. As the plane, the xy plane and the zx plane are set up. In the embodiment as shown in FIG. 1, investigating the projected objects from 1 to 5 shown in FIG. 2, a comparison is made between the image of the content and the image of the ray to be investigated that are projected onto each projected object, whereby the contents included in the groups 1 to 5 are selected in order. The selection of the content for the group i is effected by comparing the image B of each content included in the group i-1 projected onto the projected object i and the image A of the ray to be investigated projected onto the projected object i. Note that the group 0 involves all the contents included in the observation area.

FIG. 3 is a view showing the way of projection for the projected object 1 which is the x-axis in case of i=1. Reference numeral 401 denotes a content, and 405 denotes the ray to be investigated. The point of intersection of the perpendicular from each vertex of the content 401 onto the x-axis 407 that is the projected object is obtained, and the line segment connecting the points located at both ends in the outermost contour is an image 404 of the content 401 projected onto the projected object 1.

On the other hand, the points of intersection of the perpendicular from both end points of the ray 405 onto the x-axis 407 that is the projected object are obtained, and the line segment connecting the points located at both ends is an image 406 of the ray 405 projected onto the projected object 1. If the images 404 and 406 are decided, it is checked whether or not both images intersect. In FIG. 3, since the images 404 and 406 do not intersect, the content 401 is removed from the contents included in the group 1, and excepted from the shield detection object.

Similarly, the above content adding process is performed for other contents as defined in the group 0, thereby effecting the selectively incorporating process for the contents in the group 1. Further, in case of the projected objects 2 and 3 which are the y-axis and the z-axis, the above selectively incorporating process for the contents is performed.

Figure 4:
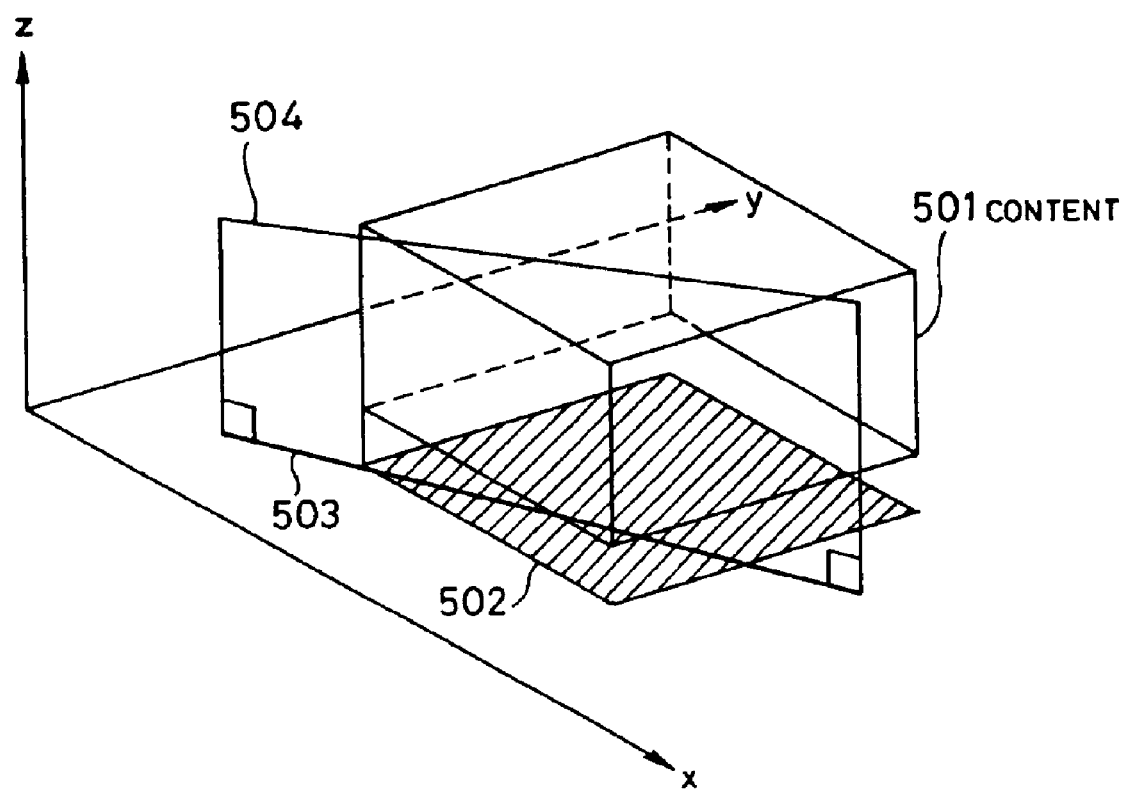
FIG. 4 is a view showing one example of projection when the projected object is an xy plane.

FIG. 4 is a view showing the way of projection when the projected object is the xy-plane as shown in FIG. 2, in case of i=4. Reference numeral 501 denotes a content belonging to the group 3, and 504 denotes the ray to be investigated. The point of intersection of the perpendicular from each vertex of the content 501 onto the projection plane is investigated, and the area connecting the points located in the outermost contour is an image 502 of the content projected onto the projected object 4. The points of intersection of the perpendicular from both end points of the ray 504 onto the projection plane are investigated, and the line segment connecting the points located at both ends is an image 503 of the ray projected on to the projected object 4.

If the images 503 and 502 are decided, it is checked whether or not both images intersect. In FIG. 4, since the images 503 and 502 intersect, the content 501 is selectively incorporated as the content included in the group 4.

Similarly, the above content adding process is performed for other contents selectively incorporated into the group 3, thereby effecting the selectively incorporating process for the contents in the group 4. Further, in case of the projected object 5 which is the zx-plane, the above selectively incorporating process for the contents is performed, making the selectively incorporating process of the contents in the group 5. The shield is detected in the three dimensional space for the contents included in the group 5, and ultimately, the shield through which the ray to be investigated passes is detected and the reflecting or transmitting point is decided.

Figure 5:
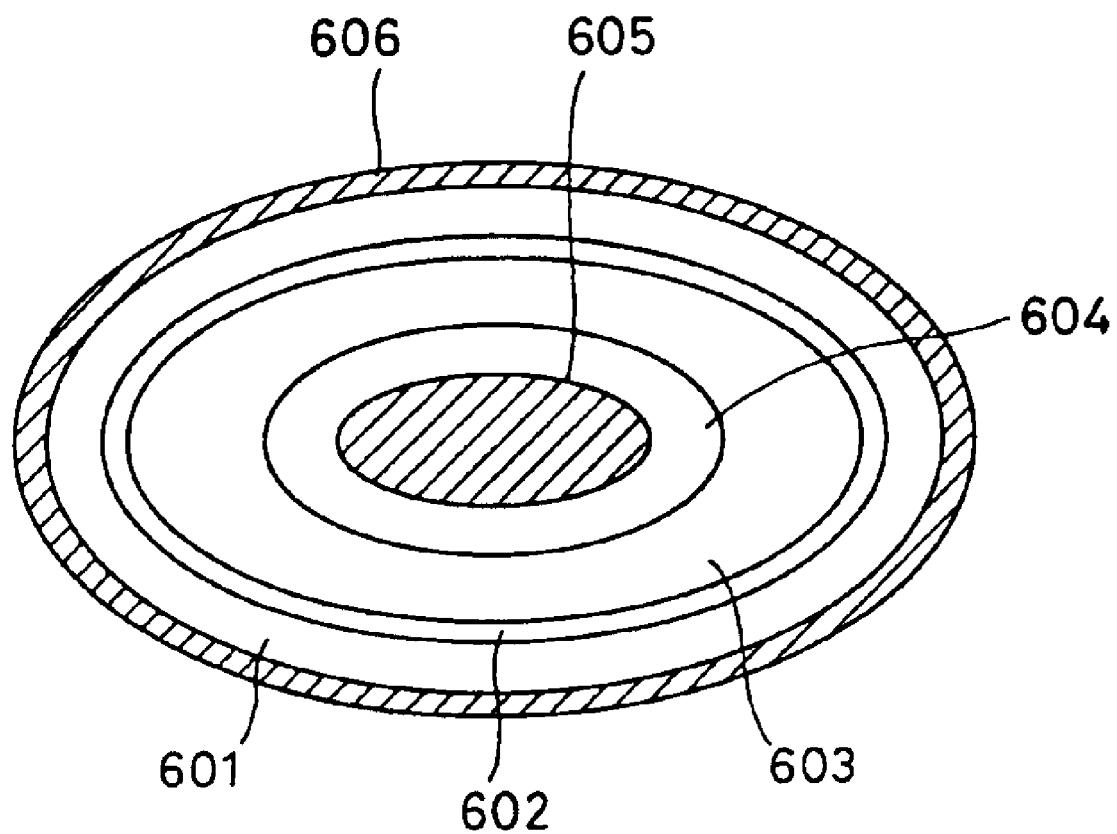
FIG. 5 is a view showing how the contents are included in group i.

FIG. 5 is a view showing how the contents are included in the group i in case of M=5. Reference numerals 606, 601, 602, 603, 604 and 605 denote the groups 0 to 5, respectively. By practicing the selectively incorporating process for the contents in each group, a size of the group is smaller as i is larger, and the content as the shield detection object is concluded. Ultimately, it is required to solve the multiple variable equations to check whether or not the ray in the three dimensional space intersects the content concluded in the group 5, as described previously. Depending on the result of calculation for the multiple variable equations, the reflecting or transmitting point of the content for the ray to be investigated can be detected.

With the conventional method, the multiple variable equations must be solved for all the contents within the observation area, namely, all the contents included in the group 0 indicated by 606. However, with this invention, the multiple variable equations are only necessary to be solved for the contents concluded in the group 5 indicated by 605, resulting in the shorter processing time.

Figure 6:
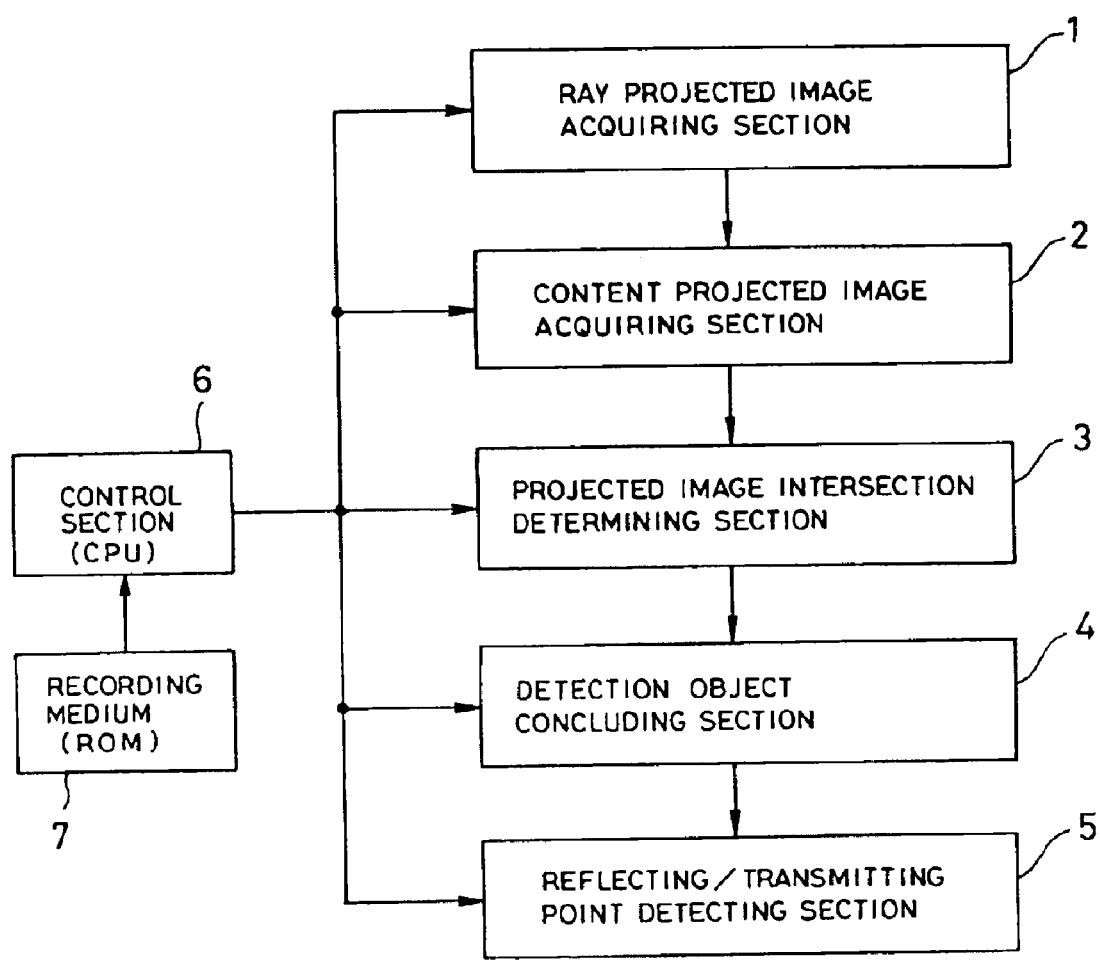
FIG. 6 is a schematic functional block diagram showing a configuration of an embodiment according to the present invention.

A functional block diagram for implementing the processing operation of this embodiment as described above is shown in FIG. 6. In FIG. 6, a projected image acquiring section 1 has a function of acquiring an image A of the ray to be investigated onto the projected object i. Also, a projected image acquiring section 2 for the content has a function of selecting the content included in the group i-1 and acquiring an image B of the content projected onto the projected object i.

A projected image intersection determining section 3 has a function of determining whether or not the images A and B intersect, and a detection object concluding section 4 has a function of incorporating selectively the content into the group i, if it is determined by the projected image intersection determining section 3 that the images A and B intersect, or if not, excluding this content from the shield detection object.

A reflecting/transmitting point detecting section 5 has a function of performing the shield detecting process and the reflecting/transmitting point detecting process for the contents belonging to the group M concluded ultimately, by solving the multiple variable equations as mentioned earlier.

A control section 6 is composed of a CPU (corresponding to a central processing unit of the computer), and has a function of controlling the execution of an operation process as shown in FIG. 1 by reading an operation control program stored in a recording medium 7 such as a read-only-memory (ROM), and controlling each of the sections 1 to 5 in accordance with a control procedure of this program.

A way of setting up the projected object i (i is a sequence number of projection) will be set forth below. As one example, the line may be set to the projected object with small value of i, and the plane may be set to the projected object with large value of i, as shown in FIG. 2. That is, since the projection onto the line has a smaller amount of computation than the projection onto the plane, the processing amount is reduced if the content that is the shield detection object is concluded beforehand by the projection with the line.

Also, another way of setting up the projected object i involves variably setting the projected object depending on the value of t, such that there is a greater difference between t and T as i is smaller, supposing that the absolute value of the elevation angle of the ray to be investigated with respect to the predetermined plane is t, and the absolute value of the elevation angle of the projected object i with respect to the predetermined plane is T.

The reason will be described below. Since the observation area is typically finite, when the difference between the elevation angle of the ray to be investigated and the elevation angle of the projected object i is large, the image of the ray onto the projected object i has so small an occupying area that many contents without intersection can be detected. Accordingly, the projected object i is set such that the difference between t and T is greater as i is smaller, whereby the contents not intersecting the ray to be investigated can be excluded from the shield detection object at the early time, resulting in the reduced processing amount.

Figure 7:
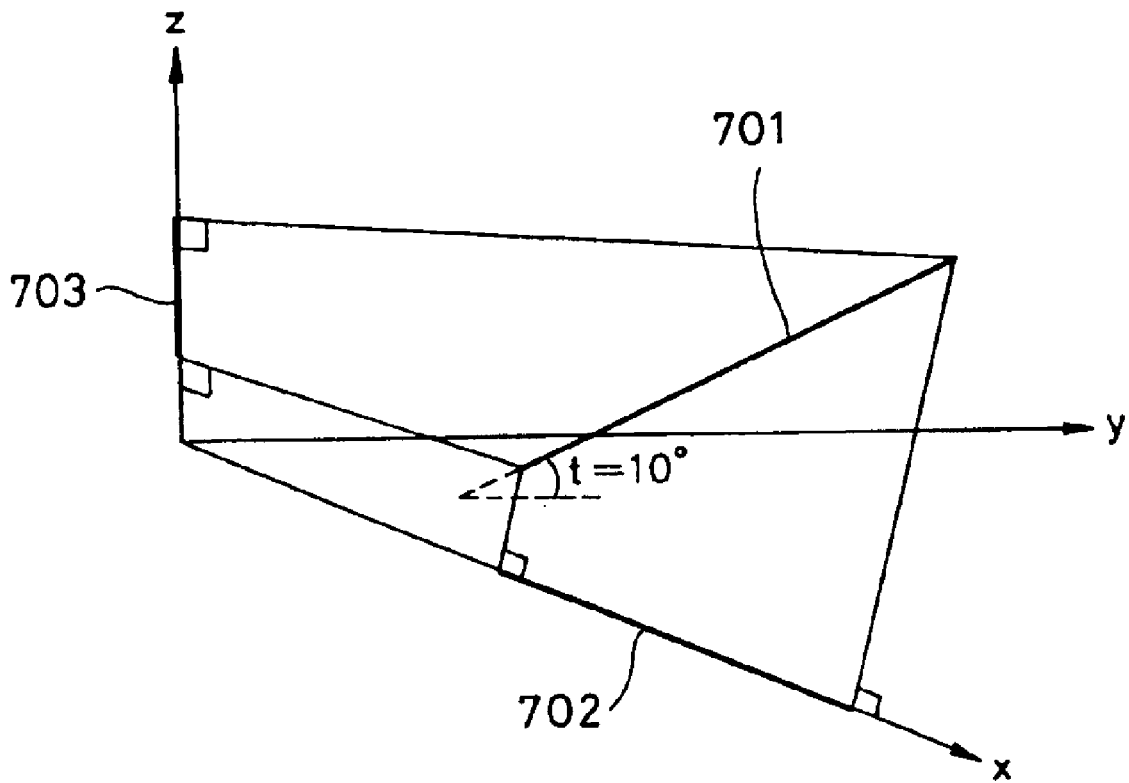
FIG. 7 is a view for explaining one example of a method for setting i of the projected object.

Referring to FIG. 7, to easily understand the setting of this projected object i, it is supposed that the xy-plane is taken as the predetermined plane, and the elevation angle t of the ray 701 to be investigated with respect to the xy-plane is 10 degrees. At this time, in the case where the projected objects are the x-axis and the z-axis, and the order i for both objects is set up, the elevation angle Tx of the x-axis with respect to the xy-plane is equal to 0 degree, and the elevation angle Tz of the z-axis with respect to the xy-plane is equal to 90 degrees. Accordingly, the difference between t and Tx and the difference between t and Tz are 10 degrees and 90 degrees, respectively, as shown in FIG. 7. Hence, in this embodiment, the projected object i is set to be smaller for the z-axis than the x-axis, so that the z-axis is selected earlier as the projected object than the x-axis.

It follows that an image 703 of a ray 701 to be investigated projected onto the z-axis that has a shorter length is set at a smaller value of i than an image 702 of the ray projected onto the x-axis.

As described above, according to the invention, in the case where the rays and the contents are given, the projected objects given by the line or plane are set up, if an image of the content projected onto the projected object and an image of the ray projected onto the projected object do not intersect, the content is excluded from the shield detection object, a plurality of projected objects i (i=1 to M) are prepared, the selection of shield detection object is performed for each projected object i in order for i=1 to M, the content of the shield detection object is concluded in sequence. Therefore, though the conventional method required the multiple variable equations to be solved for all the contents within the observation area, the present invention allows the multiple variable equations to be solved only for the concluded contents of the shield detection object. Hence, there is the effect that the processing time can be shortened.

What is claimed is:

1. A shield detection method for detecting a shield shielding a ray that travels among a plurality of contents, wherein the plurality of contents are provided in a three dimensional observation space, and wherein the ray is radiated through said observation space, said method comprising:

a first step of acquiring a first image of said ray projected onto a projected object preset within said observation space;

a second step of, for each content, acquiring a second image of each content by projecting each content onto said projected object, thereby generating a plurality of second images, wherein each second image corresponds to a content;

a third step of determining whether or not said first image intersects any of said second images; and a fourth step of including each content in a shield detection object group for said ray, if said third step indicates an intersection;

wherein said first to fourth steps are iteratively repeated for one or more additional projected objects, and wherein said second step projects each content from said shield detection object group generated in a preceding iteration.

2. A shield detection method for detecting a shield shielding a ray among a plurality of contents in predicting the radio wave propagation characteristics, in which the plurality of contents are provided in an observation space as defined within a three dimensional space, and the radio wave rays are radiated over said observation space, comprising:

a step of acquiring an image A of the ray projected onto a projected object i selected from a plurality of projected objects, wherein i=1 to M, and M is an integer of 2 or greater, and wherein a group i represents part or all of said contents, and wherein a group 0 represents a set of all the contents as defined within said observation space;

a step of selecting one content from a group i-1 and acquiring an image B of said content projected onto said projected object i;

a step of practicing a selectively incorporating process by checking whether or not said images A and B intersect, and selectively incorporating said content into the group i if said images A and B intersect;

a step of practicing the selectively incorporating process of the contents included in the group i by practicing said selectively incorporating process for each of all other contents in the group i-1; and a step of detecting the shield for the contents included in the group M and concluded ultimately by practicing the selectively incorporating process of the contents for i=1 to M in sequence.

3. The shield detection method according to claim 1, wherein said projected object is a line or a plane as defined in the three dimensional space, and said plurality of projected objects comprises different lines or planes.

4. The shield detection method according to claim 3, wherein said method is performed for line projected objects before performing said method for plane projected objects.

5. The shield detection method according to claim 1, wherein said projected objects are processed in order of ascending length of the image of the ray projected onto said projected object.

6. The shield detection method according to claim 5, wherein said order is determined by an absolute value of a difference between an absolute value of an elevation angle of said ray with respect to a predetermined plane and an absolute value of an elevation angle of said projected object with respect to the predetermined plane.

7. A shield detection system for detecting a shield shielding a ray that travels among a plurality of contents, wherein the plurality of contents are provided in a three dimensional observation space, and wherein the ray is radiated through said observation space, said system comprising:

first image acquiring means for acquiring a first image of said ray projected onto a projected object preset within said observation space;

second image acquiring means for acquiring a second image for each content by projecting each content onto said projected object, thereby generating a plurality of second images, wherein each second image corresponds to a content;

determination means for determining whether or not said first image intersects any of said second images; and detection object concluding means for concluding that content is a shield detection object for said ray, in the case where the result of determination indicates intersection;

wherein more than one projected objects are set up, and said system further comprises control means for controlling execution of said first image acquiring means, said second image acquiring means, said determination means and said detection object concluding means, such that said first image acquiring means, said second image acquiring means, said determination means and said detection object concluding means are controlled for execution for a projected object, resulting in content concluded by said detection object concluding means, then control means causes said first image acquiring means, said second image acquiring means, said determination means and said detection object concluding means to iteratively repeat the evaluation using the concluded content generated in a preceding iteration.

8. A shield detection system for detecting a shield shielding a ray among a plurality of contents in predicting the radio wave propagation characteristics, in which the plurality of contents are provided in an observation space as defined within a three dimensional space, and the radio wave rays are radiated over said observation space, comprising:

means for acquiring an image A of said ray projected onto a projected object i, selected from plurality of projected objects, wherein i=1 to M, and M is an integer of 2 or greater, and wherein a group i represents part or all of the contents, and wherein a group 0 represents a set of all the contents as defined within said observation space;

means for selecting one content from the group i-1 and acquiring an image B of said content projected onto said projected object i;

means for practicing a selectively incorporating process by checking whether or not said images A and B intersect, and selectively incorporating said content into the group i if said images A and B intersect;

means for practicing the selectively incorporating process of the contents included in the group i by practicing the content selectively incorporating process for each of all other contents in the group i-1; and means for detecting the shield for the contents included in a group M and concluded ultimately by practicing the selectively incorporating process of the contents for i=1 to M in sequence.

9. The shield detection system according to claim 7, wherein said projected object is a line or a plane defined in three dimensional space, and said plurality of projected objects comprises different lines or planes.

10. The shield detection system according to claim 9, wherein said system selects said projected object that are lines before selecting projected objects that are planes.

11. The shield detection system according to claim 7, wherein the system selects projected objects in order of ascending length of the image of the ray projected onto said projected object.

12. The shield detection system according to claim 11, wherein said order is determined by an absolute value of a difference between an absolute value of an elevation angle of said ray with respect to a predetermined plane and an absolute value of an elevation angle of said projected object with respect to the predetermined plane.

13. A recording medium recording an operation control program for a shield detection method for detecting a shield shielding a ray that travels among a plurality of contents, wherein the plurality of contents are provided in a three dimensional observation space, and wherein the ray is radiated through said observation space, said program comprising:

a first step of acquiring a first image of said ray projected onto a projected object preset within said observation space;

a second step of, for each content, acquiring a second image of each content by projecting each content onto said projected object, thereby generating a plurality of second images, wherein each second image corresponds to a content;

a third step of determining whether or not said first image intersects any of said second images; and a fourth step of including each content in a shield detection object group for said ray, if said third step indicates an intersection;

wherein said first to fourth steps are iteratively repeated for one or more additional projected objects, and wherein said second step projects each content from said shield detection object group generated in a preceding iteration.

14. A recording medium recording an operation control program for a shield detection method for detecting a shield shielding a ray among a plurality of contents in predicting the radio wave propagation characteristics, wherein the plurality of contents are provided in an observation space as defined within a three dimensional space, and the radio wave rays are radiated over said observation space, said program comprising:

a step of acquiring an image A of said ray projected onto a projected object i selected from a plurality of projected objects i, wherein i=1 to M, and M is an integer of 2 or greater, and wherein a group i represents part or all of the contents, and wherein a group 0 represents a set of all the contents as defined within said observation space;

a step of selecting one content from the group i-1 and acquiring an image B of the content projected onto said projected object i;

a step of practicing a selectively incorporating process by checking whether or not said images A and B intersect, and selectively incorporating said content into the group i if said images A and B intersect;

a step of practicing the selectively incorporating process of the contents included in the group i by practicing the selectively incorporating process for each of all other contents in the group i-1;

and a step of detecting the shield for the contents included in a group M and concluded ultimately by practicing the selectively incorporating process of the contents for i=1 to M in sequence.

15. The recording medium according to claim 13, wherein said projected object is a line or a plane as defined in the three dimensional space, and said plurality of projected objects comprises different lines or planes.

16. The recording medium according to claim 15, wherein each line projected object is processed before any plane projected objects.

17. The recording medium according to claim 13, wherein said projected objects are processed in order of ascending length of the image of the ray projected onto said projected object.

18. The recording medium according to claim 17, wherein said order is determined by an absolute value of a difference between an absolute value of an elevation angle of said ray with respect to a predetermined plane and an absolute value of an elevation angle of said projected object with respect to the predetermined plane.

* * * * *